Oct. 23, 1962  N. C. McKUSKIE  3,059,728
WHEEL LOCK
Filed Nov. 18, 1960  2 Sheets-Sheet 1
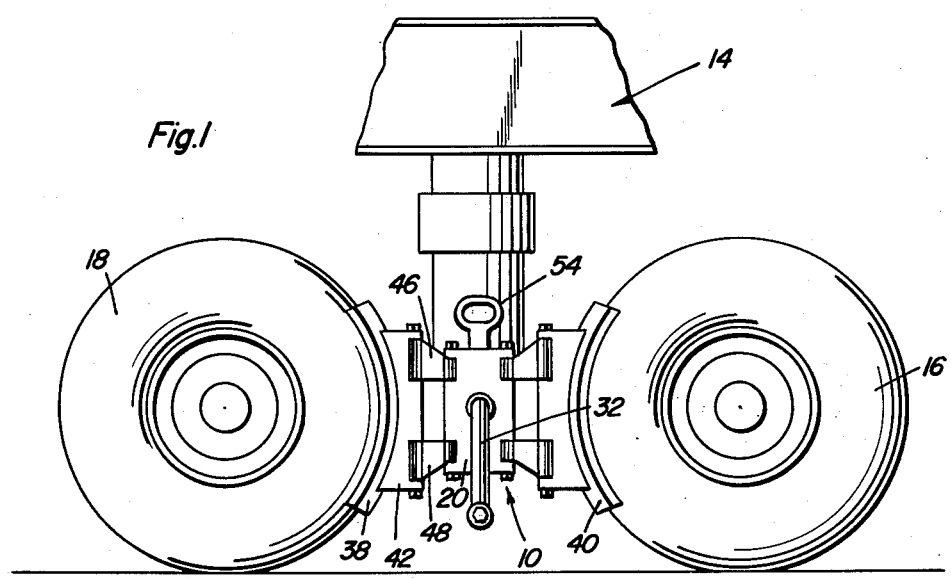
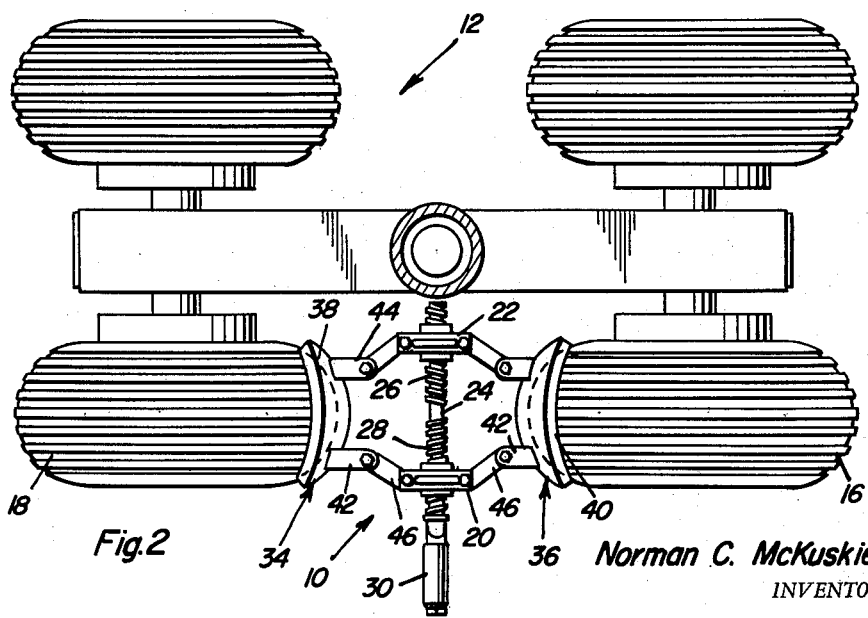
Norman C. McKuskie
INVENTOR.
BY
Attorneys

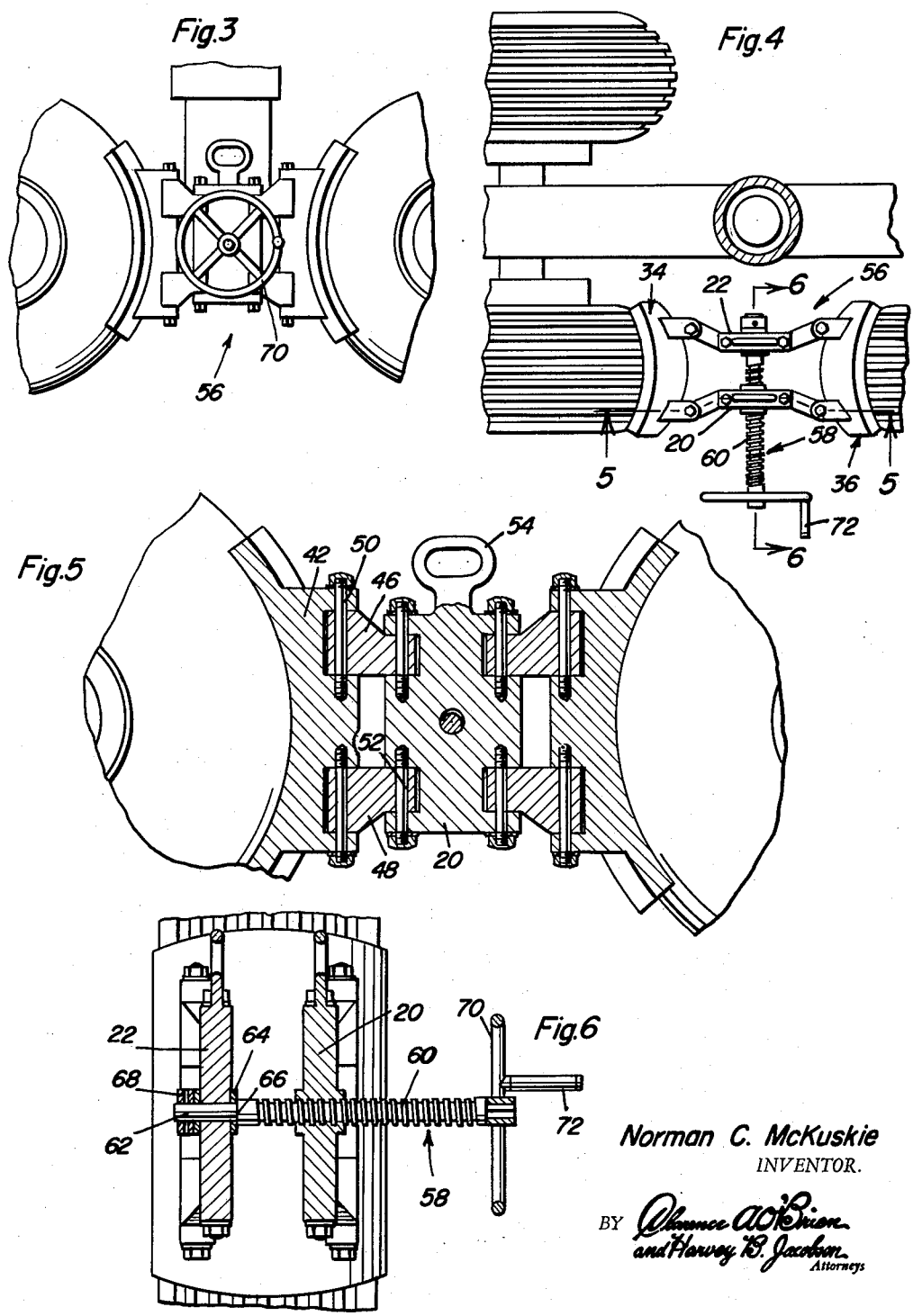

3,059,728
WHEEL LOCK
Norman C. McKuskie, Westbury, N.Y.
(2 Ogden Road, West Islip, Long Island, N.Y.)
Filed Nov. 18, 1960, Ser. No. 70,214
8 Claims. (Cl. 188—2)

This invention relates to a device for locking large tired wheels of large and heavy vehicles while in parked condition.

It is a primary object of this invention to provide a portable device which may be applied between adjacent parallel spaced tired wheels of large vehicles such as jet aircraft for maintaining the wheel thereof locked against movement while the vehicle is in parked condition.

Heretofore parking blocks or chocks have been placed on the ground in front of the large wheels of jet aircraft to prevent movement of the craft when parked. The problems encountered with the use of such parking blocks, involved difficulty in removing the blocks because of the riding up thereon of the aircraft wheels. Also, the blocks were often not as effective as desired inasmuch as they would slide along the ground surface. The parking blocks are often placed a short spaced distance from the wheels in order to avoid riding up thereon of the wheels which prevents removal of the blocks. It will therefore be appreciated that the device of this invention has for its objective to replace the parking blocks heretofore used and also eliminate all of the aforesaid problems and disadvantages connected therewith.

An additional object of this invention is to provide a portable wheel lock device which is adjustable for self-aligning engagement with tired wheels of a vehicle for effective locking thereof for the different load conditions of the vehicle. It will therefore be understood that in jet aircraft for which the wheel lock of this invention is especially designed although not necessarily restricted to, different spacings exist between the wheels because of the difference in the wheel tire displacement corresponding to different loading of the aircraft. For example, when the aircraft is empty the wheel lock must be spread apart a different distance than when the aircraft is fully loaded. It will also be appreciated that the additional load and surface projection of permanently installed wheel brakes renders the portable brake assembly additionally useful for aircraft.

A further object of this invention is to provide a portable wheel lock device capable of applying an effective locking pressure uniformly distributed to adjacent wheel tires by manual actuation of the device to apply the requisite pressure to the brake shoes through a high mechanical advantage of the operatively inter connecting linkages.

These together with other objects and advantages which will become subsequently apparent reside in the details of construction and operation as more fully hereinafter described and claimed, reference being had to the accompanying drawings forming a part hereof, wherein like numerals refer to like part throughout, and in which:

FIGURE 1 is a side elevational view of one form of wheel lock installed between a pair of adjacent tires pursuant to this invention.

FIGURE 2 is a top plan view of the installed wheel lock illustrated in FIGURE 1.

FIGURE 3 is a partial side elevational view of another form of wheel lock.

FIGURE 4 is a partial top plan view of the wheel lock illustrated in FIGURE 3.

FIGURE 5 is a sectional view taken through a plane indicated by section 5—5 in FIGURE 4.

FIGURE 6 is a sectional view taken through a plane indicated by section line 6—6 in FIGURE 4.

Referring now to the drawings in detail, FIGURES 1 and 2 illustrate one form of the wheel lock generally designated by reference numeral 10. The wheel lock is applied to a tired wheel assembly generally indicated by reference numeral 12 which contributes to the support of a large vehicle such as a jet aircraft, a portion of the air frame of which is generally designated by reference numeral 14. It will therefore be observed that the wheel assembly 12 includes two pair of aligned tired wheels including outer wheel tires 16 and 18 between which the wheel lock device 10 is installed.

The wheel lock device 10 therefore includes a pair of body members 20 and 22 of similar construction. The body members 20 and 22 are suspended in axial spaced relation to each other on a screw shaft 24 which is centrally disposed between the tires 16 and 18. The screw shaft has a pair of oppositely threaded portions 26 and 28 which respectively threadedly engage and support the body members 22 and 20 in axial alignment. Accordingly, upon rotation of the screw shaft 24 the body members 20 and 22 will be axially moved relative to each other in the desired direction. It will therefore be observed that a crank handle 30 is connected to the screw shaft 24 by means of a crank portion 32 so that the screw shaft 24 may be rotated manually at a mechanical advantage which when combined with the mechanical advantage of the screw portions 26 and 28 will axially move the body members 20 and 22 with a large force as compared to the manual force exerted on the handle 30 so as to apply large engaging forces to a pair of oppositely directed locking shoes 34 and 36.

It will therefore be observed from FIGURES 1 and 2 that the shoes 34 and 36 include curved wrap around portions 38 and 40 which engage the tires 16 and 18 along an arc both axially of the tires and along a plane perpendicular to the wheel axles. A more effective locking force may thereby be applied to the tires 16 and 18. It will also be observed that each of the shoes 34 and 36 include a pair of axially spaced hinge projections 42 and 44, the hinge projections on each of the shoes confronting each other. Referring to FIGURE 1 it will be seen that the hinge projection 42 for example includes a pair of link members 46 and 48 which are vertically spaced from each other to prevent vertical displacement between the body members and the shoes. The link members 46 and 48 are pivotally mounted in the hinge projection 42 as more clearly seen in FIGURE 5, by means of bolts 50. It will also be noted in FIGURE 5, that the link members at one end are wider for fitted engagement within the hinge recesses in the hinge projection 42, while at the other ends of the link members, a narrower portion is fitted within hinge recesses in the body member. Bolts 50 are therefore provided for hingedly connecting the link members 46 and 48 to the body members.

It will therefore be apparent from FIGURES 1 and 2, that upon rotation of the screw shaft 24 by the crank handle 30 in one direction, the body members 20 and 22 may be axially moved toward each other whereby the links 46 and 48 thereof will spread the shoes 34 and 36 apart into frictional engagement with the tires 16 and 18 for locking thereof and support of the portable assembly suspended between the tires. It will also be observed that each of the body members 20 and 22 has connected thereto and projecting thereabove a handle member 54. Accordingly, the entire wheel lock device 10 is rendered conveniently portable so that the device may be brought to or removed from the tires of the large vehicles when in parked condition.

Referring now to FIGURES 3 through 6, it will be observed that the wheel lock device generally designated by reference numeral 56 therein, except for the features to be specified hereafter, is identical to the wheel lock device 10 as hereinbefore described. From FIGURES 4 and 6, it will be observed that the screw shaft 58 differs from the screw shaft 24 of the wheel lock device 10 in that only a single threaded portion 60 is provided which is threadedly engageable with the body member 20 while the other body member 22 is axially fixed on an end portion 62 of the screw shaft 58 by means of axial thrust washers 64 axially positioned on the shaft portion 62 between the shoulder 66 thereon and the lock washer 68. Accordingly, upon rotation of the screw shaft 58 only the body member 20 will be axially moved relative to the axially fixed body member 22. The foregoing described screw shaft 58 therefore constitutes one variation from the wheel lock device as described with respect to FIGURES 1 and 2.

It will therefore be appreciated that this latter variation of the screw shaft construction accomplishes axial movement of the body members relative to each other by only moving one of the body members relative to the other which is held axially fixed whereas in the first described form of the wheel lock device, both of the body members are axially movable relative to each other.

A second variation from the wheel lock device 10 as described with respect to FIGURES 1 and 2, is in the crank device connected to the screw shaft as more clearly seen in FIGURES 3, 4 and 6. It will therefore be noticed that a spoked wheel 70 is directly connected to the outer end of the screw shaft 58 and has a crank handle 72 connected thereto. Accordingly, in this second variation, both hands may be applied for rotation of the screw shaft 58 in a more convenient manner than is possible with the crank handle of the wheel device 10.

A third variation from the wheel lock device 10 as described with respect to FIGURES 1 and 2, is in the direction of movement of the body members 20 and 22 for spreading the shoes 34 and 36 apart into frictional locking engagement with the tires 16 and 18. It will therefore be noted from FIGURE 4 in particular that the shoes 34 and 36 of the wheel lock device 56 are spread apart into locking engagement by movement of the body members 20 and 22 axially away from each other as distinguished from the action of the wheel lock device 10 of FIGURES 1 and 2 wherein the shoes 34 and 36 are spread apart by axial movement of the body members toward each other.

From the foregoing description, operation and utility of the wheel lock device made pursuant to this invention will be apparent. It will therefore be appreciated that the wheel lock device features a pair of wrap around lock shoes effectively engageable with the wheel tires by means of a high mechanical advantage actuating linkage including the rotatable screw shaft engaged with a pair of body members which are axially movable relative to each other to spread the lock shoes apart into locking engagement. The body members transmit the high forces through eight link members which are conveniently arranged for pivotal movement with respect to the shoes and the body members by hinge connections of an efficient and unique design whereby the device being unsupported by any structure will align itself to equally distribute brake pressure on both engaged tires. It will also be appreciated that the wheel lock device may be readily applied to a parked vehicle for suspended support by the engaged tires and easily removed therefrom by virtue of the handle members 54 on the body members 20 and 22 to which all of the other parts of the wheel device are assembled.

The foregoing is considered as illustrative only of the principles of the invention. Further, since numerous modifications and equivalents will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A portable parking wheel brake assembly for wheel assemblies of large vehicles having sets of adjacent parallel spaced wheel tires, comprising, a pair of axially aligned body members arranged to be freely suspended between said parallel spaced wheel tires, screw shaft means rotatably supported centrally between said body members and drivingly engaged with each body member, crank means connected to one end of said screw shaft means for rotation thereof to axially move said body members relative to each other, a pair of curved wrap-around tire shoes disposed on either side of the body members for engagement with the wheel tires to support the body members in suspended position and vertically spaced link means interconnecting each shoe to both body members for self-aligning displacement of said shoes relative to said body members into engagement with the tires in response to relative axial movement of the body member upon rotation of the screw shaft means by the crank means.

2. The device as defined in claim 1, wherein said vertically spaced link means include pairs of axially spaced hinge projections on the tire shoes confronting each other, each hinge projection being pivotally connected to a body member by a pair of vertically spaced force transmitting links to prevent vertical displacement of the shoes with respect to each other and horizontally guide movement thereof into engagement with the tires.

3. The device as defined in claim 2, including handle means connected to each body member and projecting thereabove to facilitate installation and removal of the brake assembly between the adjacent parallel spaced tires.

4. The device as defined in claim 3, wherein said screw shaft means includes a pair of oppositely directed thread means respectively threadedly engaged with each body member for self-aligning engagement of the tires by the shoes.

5. The device as defined in claim 1, wherein said screw shaft means includes means for axially fixing one of the body members thereon and thread means engageable with the other body member for axial movement thereof relative to the axially fixed body member for self-aligning engagement of the tires by the shoes.

6. The device as defined in claim 1, wherein said link means is effective to spread the shoes apart into tire engagement in response to axial movement of the body members.

7. The combination of claim 1, including handle means connected to each body member and projecting thereabove to facilitate installation and removal of the brake assembly between the adjacent parallel spaced tires.

8. The combination of claim 1, wherein said screw shaft means includes a pair of oppositely directed thread means respectively threadedly engaged with each body member for self-aligning engagement of the tires by the shoes.

References Cited in the file of this patent

UNITED STATES PATENTS

| 511,198 | Donovan | Dec. 19, 1893 |

FOREIGN PATENTS

| 110,307 | France | Nov. 15, 1875 |
| I–6–366 | Italy | Sept. 30, 1869 |